United States Patent [19]

Kulczycki

[11] Patent Number: 5,385,216
[45] Date of Patent: Jan. 31, 1995

[54] COMPOSITE REAR BRAKE DISC AND DRUM

[75] Inventor: Stanley Kulczycki, Sterling Heights, Mich.

[73] Assignee: The Budd Company, Troy, Mich.

[21] Appl. No.: 72,141

[22] Filed: Jun. 4, 1993

[51] Int. Cl.⁶ .............................................. F16D 63/00
[52] U.S. Cl. ........................... 188/70 R; 188/218 R; 188/18 A
[58] Field of Search .......... 188/218 R, 218 XL, 18 A, 188/18 R, 70 B, 70 R, 72.5, 78, 325, 250 A, 250 B, 250 D, 250 G; 192/107 R, 107 M, 107 T

[56] References Cited

U.S. PATENT DOCUMENTS

| | | | |
|---|---|---|---|
| 2,243,334 | 5/1941 | Eksergian | 188/218 R |
| 2,518,411 | 8/1950 | Wilson | 188/70 B |
| 3,051,271 | 8/1962 | Spannagel et al. | 188/18 A |
| 3,216,105 | 11/1965 | Gollwitzer | 188/218 R |
| 3,379,290 | 4/1968 | Hamilton | 188/218 R |
| 3,486,218 | 12/1969 | Buyze | 219/121.14 |
| 3,730,304 | 5/1973 | Buyze | 188/73.2 |
| 3,850,266 | 11/1974 | Hesskamp et al. | 188/70 R |
| 4,436,139 | 3/1984 | Strader | 164/112 |
| 4,784,241 | 11/1988 | Temple et al. | 188/70 R |
| 4,792,022 | 12/1988 | Thiel | 188/218 XL |
| 4,819,769 | 4/1989 | Metzler et al. | 188/218 XL |
| 4,874,064 | 10/1989 | Oono | 188/70 R |
| 4,930,606 | 6/1990 | Sporzyuski et al. | 188/218 XL |
| 4,995,481 | 2/1991 | Temple et al. | 188/70 R |
| 4,995,484 | 2/1991 | Kadel | 188/218 R |
| 5,074,387 | 12/1991 | Antonelli | 188/70 B |
| 5,115,891 | 5/1992 | Raitzer et al. | 188/218 R |

*Primary Examiner*—Mark T. Le
*Assistant Examiner*—Chris Schwartz
*Attorney, Agent, or Firm*—Harness, Dickey & Pierce

[57] ABSTRACT

A composite brake disc and drum assembly for a motor vehicle having a rear disc brake system and a parking brake system. The assembly includes a body of a first material having a mounting web, a skirt and a flange. The skirt extends from the perimeter of the mounting web and cooperates therewith to define a brake drum. The skirt has an inside surface which defines a cylindrical braking friction surface for engagement with the parking brake shoe. The flange extends outward from the skirt and at least one annular plate is supported by the flange so as to extend in a plane generally perpendicular to the axis of rotation. The plate includes a surface defining an annular braking friction surface for engagement with the disc brake pads.

9 Claims, 1 Drawing Sheet

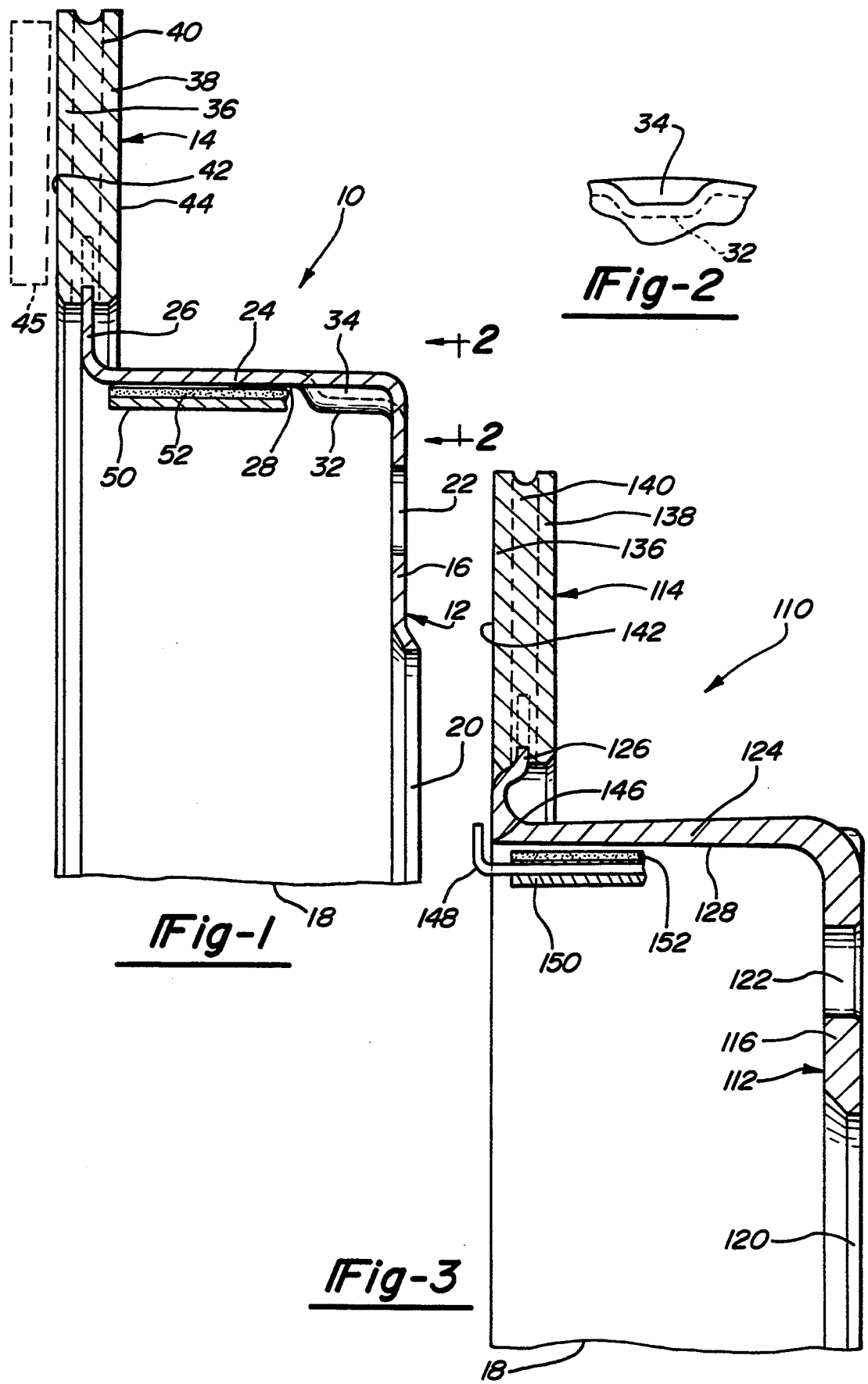

COMPOSITE REAR BRAKE DISC AND DRUM

BACKGROUND AND SUMMARY OF THE INVENTION

This invention generally relates to a motor vehicle brake assembly. More particularly, the invention relates to a composite rear brake disc and drum.

Because of their enhanced operating characteristics, rear disc brake assemblies are currently used in motor vehicles as an alternative to rear drum brake assemblies. Originally, rear disc brake assemblies were only offered as an option on high performance, high priced automobiles. Now, however, rear disc brake assemblies are often specified as standard equipment on modestly priced passenger cars and light trucks.

Although rear disc brake assemblies provide superior braking characteristics over a wider range of operating temperatures, their use does have some limitations. These drawbacks are particularly apparent with respect to parking brake requirements.

When a rear disc brake assembly is used for primary regular braking service, brake engineers and designers typically use one of two methods for parking brake application. The first of these methods involves the modification of the disc brake caliper. According to this method, the disc brake caliper is adapted to include components which will compress the piston and brake pads against the brake disc when the parking brake is actuated through the parking brake lever and cable. The second method of parking brake application used with rear disc brake assemblies includes a small, conventional brake drum packaged within the hat section of the brake disc rotor. When the parking brake is applied, a small, but otherwise conventional, brake shoe is applied to engage the drum. In this second alternative, the brake drum is intended for use during parking brake applications and is not normally used as or in conjunction with the primary or disc brake assembly. This second alternative is the most popular of the parking brake methods used with rear disc brake assemblies because of its reliability, performance and low cost.

When provided with a drum in the hat section of the disc brake rotor, conventional rear brake disc and drum assemblies are one-piece, full-cast, grey iron assemblies. The known integral disc and drum rotor assemblies are rough formed in a casting mold and then have their surfaces machined to the appropriate dimensions. Machining is typically required to form the braking friction surfaces of the disc and the drum, as well as the mounting face of the rotor assembly and the wheel lug mounting holes. Obviously, this amount of machining is a laborious process and any reduction in machining time would be desirable. Another limitation of the unitarily cast disc and drum is that the casting process itself necessarily requires a rotor assembly which is heavy. As always with motor vehicles, it is desirable to reduce weight whenever and wherever possible.

With the limitations of the known rear brake disc and drum assemblies in mind, it is a primary object of the present invention to provide a rear brake disc and drum assembly which overcomes the above mentioned drawbacks.

Another object of the invention is to provide a brake disc and drum assembly which requires a minimal amount of machining and which has a reduced weight relative to known brake disc and drum assemblies. Yet another object of this invention is to enable the use of alternative materials for the grey cast iron now used for the disc plates.

A further object of the invention is to decrease the size of the drum package so as to allow for maximum sizing of the disc plates and the primary braking friction surfaces. A still further object of the invention is to provide a brake disc and drum assembly in which the drum, and its related mechanisms, can be used to stop the vehicle under dynamic conditions where there has been a partial failure in the primary brake system.

In achieving the above objectives, the present invention discloses a brake rotor which is a composite rear brake disc and drum assembly. The hat section of the assembly is formed from flat plate stock and includes portions which define the drum of the assembly. The hat section more specifically includes a mounting portion, a cylindrical skirt and a flange.

The mounting web of the hat section defines a mounting face that receives the mounting lugs of the vehicle's wheel mounting assembly. The cylindrical skirt extends from the mounting web so as to define an axis of rotation for the assembly. The cylindrical skirt also includes an inside surface that defines the cylindrical braking friction surface of the drum. This braking friction surface is concentric with the axis of rotation. Opposite of the mounting web, the cylindrical skirt terminates in the radially extending flange.

Once the hat section of the assembly has been formed, it is placed within a casting mold. In the mold, the disc plates of the assembly are cast onto the hat section so that they are supported on the flange. The disc plates are annular structures which define inboard and outboard braking friction surfaces oriented transversely of the axis of rotation.

The composite nature of the assembly has several advantages over the known prior designs. First, the assembly requires a minimal amount of machining in comparison to the prior designs. In the present invention, only the braking friction surfaces of the disc plate require machining. Another benefit of the present invention is that the assembly is lighter without compromising strength. Lighter weight is achieved by forming the hat section by a method other than casting. Two methods for forming the hat section include stamping and hydro-spinning. Both methods allow for the thickness of the hat section to be reduced of the prior cast designs. When formed by the hydro-spun method, the hat section is capable of exhibiting a section thickness which varies across its respective portions. As such, the hat section can be made with an increased thickness where the extra strength is needed, such as in the mounting web where clamping loads must be resisted, and a reduced thickness where the extra strength is not needed, such as in the flange.

Additional benefits and advantages of the present invention will become apparent to those skilled in the art to which this invention relates from the subsequent description of the preferred embodiments and the appended claims, taken in conjunction with the accompanying drawings.

BRIEF DESCRIPTION OF THE DRAWINGS

FIG. 1 is a sectional view of a portion of a brake disc and drum assembly incorporating the principles of the present invention;

FIG. 2 is an elevational view taken substantially along line 2—2 in FIG. 1 showing a portion of the assembly illustrated therein; and FIG. 3 is a sectional view of a portion of another embodiment of a brake disc and drum assembly incorporating the principles of the present invention.

DETAILED DESCRIPTION OF THE DRAWINGS

Referring now to the drawing, a composite brake disc and drum assembly incorporating the principles of the present invention is illustrated in FIG. 1 and generally designated at 10. The assembly 10 primarily includes a body or hat section 12 of a first material and a disc plate section 14 of a second material. The plate section 14 is supported by the hat section 12 for rotation about an axis of rotation 18. Two embodiments of the assembly, designated as 10 and 110, are presented herein.

The hat section 12 is of a one piece construction and includes a mounting web 16, a cylindrical portion or skirt 24 and a flange 26. The mounting web 16 is used to secure the assembly 10 to the wheel assembly of the vehicle (not shown) and defines a face that extends generally transverse to the axis of rotation 18. Two sets of openings are defined in the mounting web 16. the first of these is a central opening 20 which is coaxial with the axis of rotation 18. The central opening 20 is sized to receive a cylindrical extension of the wheel assembly rotor (not shown). Located equidistantly around the central opening 20 are bolt openings 22. Depending on the intended application of the assembly 10, four, five or six bolt openings 22 would typically be provided.

Extending from the radially outer perimeter of the mounting web 16, the cylindrical skirt 24 is generally coaxial with the axis of rotation 18 and cooperates with the mounting web 16 to define a brake drum. The opposing end of the cylindrical skirt 24 terminates at the flange 26 which extends in a transverse direction relative to the axis of rotation 18.

The inner surface of the cylindrical skirt 24 forms a braking friction surface 28 of the brake drum. This braking friction surface 28 defines a cylindrical surface which is coaxial with the axis of rotation 18. During use of the parking brake assembly, a brake shoe 50, coated with a friction material or brake lining 52, is biased by a mechanical lever (not shown) into engagement with the braking friction surface 28 of the drum. The coefficient of friction between the brake lining 52 and the braking friction surface 28 and the force exerted by the brake shoe 50 onto the skirt 12 are of a sufficient magnitude to prevent movement of the vehicle under its own weight.

Currently, rear disk brake assemblies must meet certain governmental requirements relating to partial brake system failure. Although used mainly during parking, the parking brake assembly must be able to assist in stopping the vehicle under dynamic braking conditions where there has been a partial system failure of the primary or disc brake assembly. When the brake lining 52 is forced against the braking friction surface 28 under dynamic conditions, the various dynamic forces often cause the brake shoe 50 to lift up off of the braking friction surface 28 and move in an outboard direction toward the mounting web 16. This outboard movement of the brake shoe 50 causes, among other things, noise, excessive wear and decreased braking effectiveness.

To compensate for and limit the outboard movement of the brake shoe 50 in a dynamic stop situation, this embodiment of the present invention is formed with an embossment 32 in the hat section 12. As seen in FIGS. 1 and 2, the embossment 32 is formed in the cylindrical skirt 24 of the hat section 12, generally adjacent to the mounting web 16. A number of the embossments 32 can be formed equidistantly around the hat section 12 so that the brake shoe 50 will always be adjacent to at least one of the embossments 32. This also ensures that the assembly 10 will remain balanced. The embossment 32 extends inward from the cylindrical skirt 24 toward the axis of rotation 18 forming a raised portion on the braking friction surface 28. This results in a recess 34 being formed in the exterior surface of the cylindrical skirt 24.

Once the hat section 12 has been formed, as more fully discussed below, the cast plate section 14 is formed so that it is supported by the flange 26. In forming the plate section 14, the hat section 12 is positioned within a casting mold (not shown) with the terminal end of the flange 26 extending into the mold cavity which defines the plate section 14. The molten casting material, preferably grey iron, is then poured into the mold cavity where it encapsulates the terminal end of the flange 26 and hardens to form the plate section 14.

As seen in the Figures, the plate section 14 is generally an annular structure that is positioned on the flange 26 so that it extends in a plane perpendicular to the axis of rotation 18. In the illustrated embodiments, the plate section 14 includes portions that define a pair of parallel plates 36 and 38, respectively the inboard plate and the outboard plate, which are interconnected by an annular rib 40 which extends continuously around the plate section 14. Alternatively, the continuous rib 40 could be replaced by a series of spaced apart webs or ribs 40 defining air cooling passageways for the assembly therebetween. The inboard and outboard plates 36 and 38 have oppositely facing surfaces which respectively define an inboard braking friction surface 42 and an outboard braking friction surface 44 on the plate section 14 for engagement between brake pads 45, only one of which is shown.

Once the raw casting of the plate section 14 has been formed onto the flange 26, the only machining required with the present invention is that of the inboard braking friction surface 42 and the outboard braking friction surface 44. As will be seen in the preferred methods of forming the hat section 12, no machining of the hat section 12 is necessary. However, the braking friction surface 28 of the cylindrical skirt 24 can be roughened to increase its coefficient of friction.

As mentioned above, two embodiments of the present invention are disclosed. The variations between the embodiments are principally found in the hat sections.

The hat section 12 of the first embodiment, shows in FIG. 1, is formed by a stamping process, in forming this hat section 12, a workpiece of flat metal stock, preferably steel, is positioned over a stamping mold and stamped into the desired configuration having the features discussed above. The resulting hat section 12 requires no additional machining. While not required, if it is desired, the braking friction surface 28 can be shot blasted to provide it with a roughened surface finish thereby increasing the hill holding effectiveness of the parking brake assembly and the drum of the hat section 12.

By forming the hat section 12 through a stamping process, a significant weight reduction is achieved over the prior full-cast hat and drum assemblies. This weight reduction is principally gained by decreasing the thickness of the entire hat section 12. Full-cast assemblies necessitate a substantial thickness because of the process limitations involved with casting the hat sections. These process limitations are not found in the stamping process.

The second embodiment of the composite disc and drum assembly of the present invention is illustrated in FIG. 3 and generally designated at 110. As in the first embodiment, this second embodiment principally includes a hat section 112 and a plate section 114. The hat section 112 itself is further comprised of a mounting web 116, a cylindrical skirt 124 and a flange 126.

The mounting web 116 is used to mount the assembly 110 to the wheel assembly of a motor vehicle for rotation about an axis of rotation 18. To enable mounting of the assembly 110, the mounting web 116 includes a central annular opening 120 as well as a plurality of bolt openings 122 equidistantly positioned mounting web 116 includes a central annular opening 120 as well as a plurality of bolt openings 122 equidistantly positioned around the annular opening 120. The central opening 120 is sized to receive a cylindrical extension of the rotor of the wheel assembly while the bolt openings 122 receive the mounting or lug bolts therethrough.

The cylindrical skirt 124 extends from the perimeter of the mounting web 116 and is generally coaxial with the axis of rotation 18. The opposite end of the cylindrical skirt 124 terminates in the flange 126, which extends transversely from the axis of rotation 18. Additionally, a braking friction surface 128 is defined on the interior of the cylindrical skirt 124. This surface 128 is coaxial with the axis of rotation 18 and is also adapted to be engaged by a brake shoe 150 covered with a frictional material or brake lining 152 as discussed above with reference to the first embodiment.

Once the hat section 112 of this second embodiment is formed, it is positioned within a casting mold so that the terminal end of the flange 126 extends into the cavity defined by the casting mold. This allows the plate section 114 to be cast so as to encapsulate and be supported by the terminal end of the flange 126. Thus, the plate section 114 similarly includes an inboard plate 136, an outboard plate 138, and a rib 140, as well as inboard and outboard braking friction surfaces 142 and 144.

In forming the hat section 112 of the second embodiment, a process known as hydro-spinning is utilized. To form hydro-spun hat section 112, a flat workpiece of metal stock is spun on a spindle at a high rate of speed. The spinning workpiece is engaged by mandrels which deform the plate into the desired configuration. As with the prior embodiment, after its initial forming, the hat section 112 of this embodiment requires no machining in addition to that discussed above.

Deformation of the spinning plate by the mandrels allows for sharp corners to be formed where desired. As used herein, the term "sharp" corners is meant to distinguish from "rounded" corners, which exhibit a significant radius of curvature, as found in the known designs and as generally produced by other production methods, e.g. stamping.

In the present embodiment, a sharp corner 146 is formed at the inboard or innermost end of the hat section's 112 cylindrical skirt 124. The provision of this sharp corner 146 allows the brake shoe 150 to be provided with a safety tab 148 which extends axially past the flange 126 at the end of the cylindrical skirt 124 and then in a direction transverse to the axis of rotation 18 and generally parallel to the surface defining the inboard end of the skirt 124. During use of the parking brake assembly in dynamic stop situations, such as where there has been at least a partial loss of primary braking capacity, the safety tab 148 will interferingly engage the inboard surface of the sharp corner 146 and limit outboard movement of the brake shoe 150 along with associated problems of this movement.

Using the hydro-spun process, the hat section 112 can also be contoured by the mandrels so that it will have a varying thickness. This allows for optimization of the material stock used in the hat section 112. For example, the hat section 112 can be provided with a thicker mounting web 116 to resist clamping loads associated with the wheel assembly. The hat section 112 can also be provided with a thin flange 126 since resistance to clamping loads is not necessary in the flange 126. Also, the finish of various hat section 112 surfaces can be varied by varying the feed and speed during the hydro-spinning operation. In particular, the finish of the braking friction surface 128 can be varied to enhance the hill holding effectiveness of the parking brake.

While the above description constitutes the preferred embodiments of the present invention, it will be appreciated that the invention is susceptible to modification, variation and change without departing from the proper scope and fair meaning of the accompanying claims.

I claim:

1. A composite brake disc and drum assembly for a motor vehicle having a rear disc brake system and a parking brake system using a brake shoe of a predetermined width, said assembly comprising:

a unitarily formed body of a first material and adapted for rotation about an axis of rotation, said body including a generally annular mounting web extending in a direction transverse to said axis of rotation, said mounting web having means for mounting said assembly to said motor vehicle, said body also including a skirt extending from a radially outward perimeter of said mounting web, said skirt having an inner cylindrical surface of a width greater than said predetermined width of the brake shoe, said cylindrical surface defining a braking frictional surface coaxial with said axis of rotation and adapted for engagement with the brake shoe, said body further including a flange extending radially outward from said skirt;

limiting means for limiting outboard axial movement of the brake shoe during dynamic engagement of the brake shoe with said braking frictional surface, said limiting means includes at least one embossment formed in said body, said embossment being a raised portion of said inner cylindrical surface directed inward toward said axis of rotation, said embossment extending only partially around said inner cylindrical surface; and at least one generally annular braking plate of a second material, said braking plate extending substantially along a plane perpendicular to said axis of rotation and being supported by said flange, said braking plate including portions defining a face having an annular braking friction surface adapted for engagement with a brake pad of the disc brake system.

2. A composite brake disc and drum assembly as set forth in claim 1 wherein said embossment is located adjacent to said mounting web.

3. A composite brake disc and drum assembly as set forth in claim 1 wherein said braking plate is a cast material.

4. A composite brake disc and drum assembly as set forth in claim 1 wherein said second material is grey iron.

5. A composite brake disc and drum assembly as set forth in claim 1 wherein said body is hydro-spun plate stock.

6. A composite brake disc and drum assembly as set forth in claim 1 wherein said body is stamped plate stock.

7. A composite brake disc and drum assembly as set forth in claim 1 wherein said first material is steel.

8. A composite brake disc and drum assembly for a motor vehicle having a rear disc brake system and a parking brake system, said assembly comprising:

a unitarily formed body of a first material and adapted for rotation about an axis of rotation, said body including a generally annular mounting web extending in a direction transverse to said axis of rotation, said mounting web having means for mounting said assembly to said motor vehicle, said body also including a skirt extending from a radially outward perimeter of said mounting web, said skirt having an inner cylindrical surface defining a braking frictional surface coaxial with said axis of rotation and adapted for engagement with the brake shoe, said body further including a flange extending radially outward from said skirt;

at least one generally annular braking plate of a second material, said braking plate extending substantially along a plane perpendicular to said axis of rotation and being supported by said flange, said braking plate including portions defining a face having an annular braking fiction surface adapted for engagement with the disc brake system;

a brake shoe associated with the parking brake system and adapted to engage said braking frictional surface; and limiting means for limiting outboard axial movement of said brake shoe during dynamic engagement of said brake shoe with said braking frictional surface, said limiting means including a portion of said brake shoe engageable with a portion of said body other than said mounting web and said braking frictional surface.

9. A composite brake disc and drum assembly for a motor vehicle having a rear disc brake system and a parking brake system, said assembly comprising:

a unitarily formed body of a first material and adapted for rotation about an axis of rotation, said body including a generally annular mounting web extending in a direction transverse to said axis of rotation, said mounting web having means for mounting said assembly to said motor vehicle, said body also including a skirt extending from a radially outward perimeter of said mounting web, said skirt having an inner cylindrical surface defining a braking frictional surface coaxial with said axis of rotation and adapted for engagement with the brake shoe, said body further including a flange extending radially outward from said skirt;

at least one generally annular braking plate of a second material, said braking plate extending substantially along a plane perpendicular to said axis of rotation and being supported by said flange, said braking plate including portions defining a face having an annular braking friction surface adapted for engagement with the disc brake system;

a brake shoe associated with the parking brake system and adapted to engage said braking friction surface; and limiting means for limiting axial movement of said brake shoe during dynamic engagement of said brake shoe with said braking friction surface, said limiting means including a sharp corner formed between said skirt and said flange and also including a tab mounted to said brake shoe, said tab being located to engage said corner during outboard movement of said brake shoe and thereby limit movement of said brake shoe.

* * * * *